United States Patent
Thomas et al.

(10) Patent No.: US 12,362,846 B2
(45) Date of Patent: Jul. 15, 2025

(54) METHOD FOR COMMUNICATION ACCORDING TO A TDMA PROTOCOL BETWEEN A MASTER DEVICE AND AT LEAST ONE SLAVE DEVICE

(71) Applicant: SAFRAN, Paris (FR)

(72) Inventors: Patrick Thomas, Moissy-Cramayel (FR); Raouia Ghodhbane, Moissy-Cramayel (FR)

(73) Assignee: SAFRAN, Paris (FR)

( * ) Notice: Subject to any disclaimer, the term of this patent is extended or adjusted under 35 U.S.C. 154(b) by 368 days.

(21) Appl. No.: 17/759,990

(22) PCT Filed: Mar. 15, 2021

(86) PCT No.: PCT/EP2021/056456
§ 371 (c)(1),
(2) Date: Aug. 2, 2022

(87) PCT Pub. No.: WO2021/190963
PCT Pub. Date: Sep. 30, 2021

(65) Prior Publication Data
US 2023/0060643 A1 Mar. 2, 2023

(30) Foreign Application Priority Data
Mar. 26, 2020 (FR) ...................................... 2002943

(51) Int. Cl.
*H04J 3/06* (2006.01)
*H04J 3/16* (2006.01)

(52) U.S. Cl.
CPC .......... *H04J 3/0652* (2013.01); *H04J 3/0644* (2013.01); *H04J 3/1676* (2013.01)

(58) Field of Classification Search
CPC .... H04B 7/2643; H04J 3/0635; H04J 3/0638; H04J 3/0647; H04J 3/0652; H04J 3/1676; H04W 56/0015
(Continued)

(56) References Cited

U.S. PATENT DOCUMENTS 9,642,107 B1 * 5/2017 Chen ...................... H04L 25/00
11,563,615 B2 * 1/2023 Eger ................... H04L 25/0224
(Continued)

FOREIGN PATENT DOCUMENTS

| EP | 3273620 A1 | 1/2018 |
| EP | 3444975 A1 | 2/2019 |

(Continued)

OTHER PUBLICATIONS

Search Report from the French Intellectual Property Office on corresponding FR application (FR2002943) dated Dec. 10, 2020.
(Continued)

*Primary Examiner* — Robert J Lopata
(74) *Attorney, Agent, or Firm* — Alumen IP Law PC

(57) ABSTRACT

Disclosed is a method for communication, according to a TDMA protocol, between a master device and at least one slave device, during which a plurality of frames are transmitted between the master device and the slave device, each frame being partitioned into a plurality of time intervals, at least one time interval having an analogue synchronization signal having an amplitude regulation portion in the form of a sine wave having a constant amplitude over a number of predetermined pulses, and an optimized synchronization portion in the form of a triangular amplitude modulation of the sine wave so as to determine a reference time.

11 Claims, 6 Drawing Sheets

(58) Field of Classification Search
USPC .......................................................... 370/329
See application file for complete search history.

(56) References Cited

U.S. PATENT DOCUMENTS

| | | |
|---|---|---|
| 2008/0056419 A1 | 3/2008 | Lee et al. |
| 2017/0099077 A1* | 4/2017 | Tamma ............. H04L 25/03012 |
| 2018/0234175 A1* | 8/2018 | Fok ...................... H04B 10/508 |
| 2019/0356466 A1* | 11/2019 | Kratz ................... G01S 13/765 |

FOREIGN PATENT DOCUMENTS

| | | |
|---|---|---|
| WO | 02065707 A2 | 8/2002 |
| WO | 2014091592 A1 | 6/2014 |

OTHER PUBLICATIONS

International Search Report and Written Opinion on corresponding PCT application (PCT/EP2021/056456) from International Searching Authority (EPO) dated May 31, 2021.

* cited by examiner

METHOD FOR COMMUNICATION ACCORDING TO A TDMA PROTOCOL BETWEEN A MASTER DEVICE AND AT LEAST ONE SLAVE DEVICE

TECHNICAL FIELD

The present invention relates to the field of synchronization between a master device and at least one slave device that communicate according to a TDMA (time division multiple access) protocol.

In a known manner, according to the TDMA protocol, frames are transmitted between a master device and slave devices. Each frame is partitioned into time slots for communication of the master device or predetermined slave devices. The master device comprises a master clock that clocks the transmission of data. Similarly, each slave device comprises a slave clock that clocks the reception of data.

In order to enable data reception under the best conditions, the clocks of the master device and the slave device have to be perfectly synchronized. In practice, a time slot of a frame comprises an analog waveform modulated by a digital signal. In a known manner, the clocks are digitally synchronized by a programmed clock reference (PCR) defined by the digital signal. The synchronization of the clocks depends on the transmission of the programmed clock references PCR.

In practice, an error in the frequency of the slave clock (drift, etc.) is detected by comparing the timestamping provided by the programmed clock reference (PCR) and the value of a time counter of the slave device. Following detection, it is possible to correct the frequency of the slave clock. Such a synchronization method has several drawbacks.

Firstly, timestamping of the packets in a frame is of low accuracy, which affects quality of the synchronization. There is a need for microsecond accuracy. In addition, synchronization solutions based on correlation of digital signals affect throughput as it is necessary to provide dedicated space in each frame for analog waves modulated by a digital signal.

Furthermore, to extract the master clock, the slave device has to comprise an extraction circuit that comprises a digital processing chain that has to be kept running at all times. In other words, from an energy point of view, the digital processing chain is highly power consuming, which is a drawback for an embedded slave device that does not have a large capacity electric battery.

Methods according to prior art are known, for example, from documents EP3444975A1 and WO2014/0915592A.

The invention thus aims to eliminate at least some of these disadvantages by providing a new method of communication according to the TDMA protocol.

SUMMARY

The invention relates to a method of communication according to a TDMA protocol between a master device and at least one slave device during which a plurality of frames are transmitted between the master device and the slave device, each frame being partitioned into a plurality of time slots, at least one time slot comprising an analog synchronization signal, transmitted by the master device to the slave device, comprising an amplitude setting portion which is in the form of a sine wave having a constant amplitude during a predetermined number of pulses, and an optimized synchronization portion which is in the form of a triangular-shaped amplitude modulation of the sine wave so as to determine a reference time instant.

Advantageously, this allows the gain of the slave device to be set by analysis of the amplitude setting portion which comprises several constant amplitude pulses and thus forms reference amplitudes. Furthermore, a triangular-shaped amplitude modulation allows a characteristic shape to be defined with an increasing phase and a decreasing phase which can be easily detected by signal analysis. The determination of a reference time instant, especially at the transition between the two phases, makes it possible to obtain a very high degree of accuracy. The clock of the master device can thus be synchronized accurately with the clock of the slave device. Finally, the portions of the analog synchronization signal are formed from the same sine wave, which limits the technical means required to form such an analog synchronization signal.

Preferably, the triangular-shaped amplitude modulation of the sine wave comprises an increasing amplitude phase and a decreasing amplitude phase, the reference time instant being determined at the transition between the increasing amplitude phase and the decreasing amplitude phase.

Preferably, the triangular-shaped amplitude modulation of the sine wave comprises an odd number of pulses, the reference time instant being determined during a central pulse.

Preferably, the sine wave is pure. This allows its frequency to be measured very accurately.

According to one preferred aspect, the sine wave has a period between 0.1 and 10 microseconds, preferably in the order of one microsecond. This provides a high degree of accuracy.

Preferably, the amplitude setting portion has a number of pulses greater than 16 and preferably less than 40. Such a number of pulses ensures a good compromise between speed and accuracy when setting the gain.

Preferably, the optimized synchronization portion has a number of pulses of 3 and preferably less than 7, preferably 5. Such a number of pulses ensures optimal detection over a short period.

The invention also relates to a transmission module for transmitting data from a master device to at least one slave device in a frame according to a TDMA protocol, each frame being partitioned into a plurality of time slots, at least one time slot comprising an analog synchronization signal, the analog synchronization signal comprising an amplitude setting portion which is in the form of a sine wave having a constant amplitude during a predetermined number of pulses, and an optimized synchronization portion which is in the form of a triangular-shaped amplitude modulation of the sine wave so as to determine a reference time instant, the transmission module comprising a master signal generator, an analog synchronization signal generator, and a master clock, connected to both generators, which controls the generation rate of the master signal and the analog synchronization signal.

Preferably, the analog synchronization signal generator comprises a pulse generation member and a processing member for processing said pulses to form the different portions of the analog synchronization signal, the processing member comprising a weighted adder circuit so as to perform a triangular-shaped amplitude modulation of the optimized synchronization portion.

The invention also relates to a reception module for receiving data, transmitted by a master device to at least one slave device, in a frame according to a TDMA protocol, each frame being partitioned into a plurality of time slots, at least one time slot comprising an analog synchronization signal, the analog synchronization signal comprising an amplitude setting portion which is in the form of a sine wave having a constant amplitude during a predetermined number of pulses, and an optimized synchronization portion which is in the form of a triangular-shaped amplitude modulation of the sine wave so as to determine a reference time instant, the reception module comprising an extraction system for extracting the reference time instants and a setting system for setting a slave clock from said reference time instants.

Preferably, the extraction system comprises a programmable gain amplifier and voltage comparators configured to accurately determine amplitude of the analog timing signal and to deduce a setting for the programmable gain amplifier therefrom.

The invention also relates to an assembly of a transmission module as previously set forth and a reception module as previously set forth for transmitting and receiving frames.

BRIEF DESCRIPTION OF THE DRAWINGS

The invention will be better understood upon reading the following description, which is given solely by way of example, and referring to the appended figures given as non-limiting examples, in which identical references are given to similar objects.

It should be noted that the figures set out the invention in detail for implementing the invention, said figures of course may of course be used to better define the invention where appropriate.

DETAILED DESCRIPTION

Figure 1:
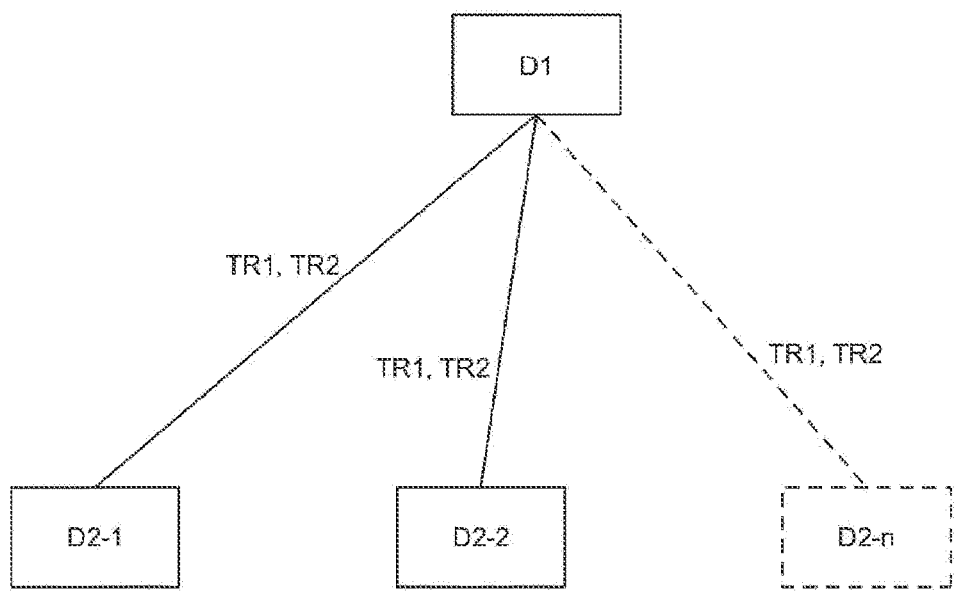
FIG. 1 is a schematic representation of a master device communicating with a plurality of slave type devices according to one embodiment of the invention.

The invention relates to a method of communication according to a TDMA (Time Division Multiple Access) protocol between a master device and at least one slave device. In this example, with reference to FIG. 1, a single master device D1 is represented communicating with n slave devices D2 (D2-1, D2-2, D2-n). Hereafter, for the sake of clarity and conciseness, a general reference will be made to a slave device D2. Communication from the master device DA to a slave device D2 is mainly set forth in this example, but there is also communication from the slave devices D2 to the master device D1.

Preferably, a master device D1 and a slave device D2 are electronic devices. In this example, the devices D1, D2 are used in an aeronautical context, in particular, for sensor and actuator networks in an aircraft.

In a known manner, according to the TDMA protocol, frames TR1, TR2 are transmitted over the network, each frame TR1, TR2 comprising time slots for transmitting data from the master device D1 and for transmitting data from predetermined slave devices D2. In this example, each frame TR1, TR2 has a duration of about 1 ms.

The master device D1 comprises a master clock HORL1 which clocks the transmission of data in a frame TR1, TR2. Similarly, each slave device D2 comprises a slave clock HORL2 which clocks the reception of data in a frame TR1, TR2.

Figure 2:
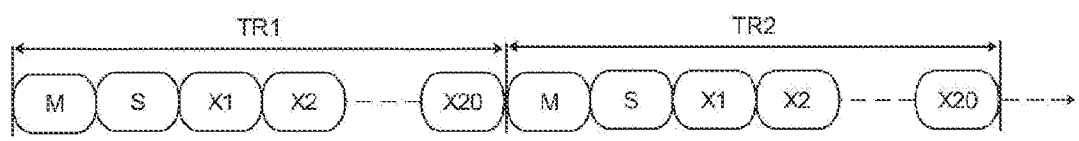
FIG. 2 is a schematic representation of a frame transmitted over the network.

As illustrated in FIG. 2, each frame TR1, TR2 comprises a master signal M, comprising data from the master device D1, transmitted by the master device D1 to the slave devices D2, and an analog synchronization signal S, transmitted by the master device D1 to the slave devices D2. Each frame TR1, TR2 further comprises time slots X1-X20 for transmitting data from each slave device D2 to the master device D1.

In this example implementation, in order to obtain accurate synchronization, the distance between the master device D1 and the slave device D2 does not exceed 30 m and induces a maximum delay in the order of 150 ns.

According to the invention, the analog synchronization signal S comprises an amplitude setting portion S1 which is in the form of a sine wave having a constant amplitude during a predetermined number of pulses, and an optimized synchronization portion S2 which is in the form of a triangular-shaped amplitude modulation of the sine wave so as to determine a reference time instant TOP.

Figure 3:
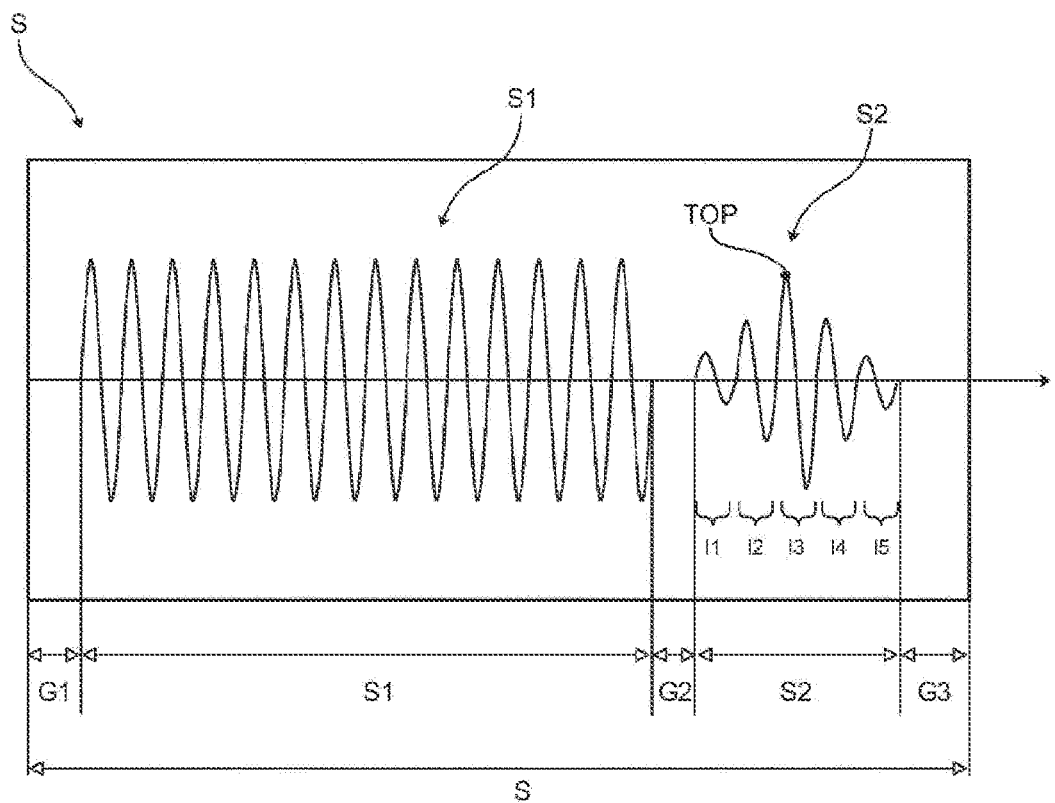
FIG. 3 is a schematic representation of an analog synchronization signal of a frame of FIG. 2.

In accordance with the invention, as illustrated in FIG. 3, the analog synchronization signal S comprises an amplitude setting portion S1 and an optimized synchronization portion S2 which will be set out in detail. Advantageously, such an analog synchronization signal S allows the gain of the slave device D2 to be finely set, the master clock HORL1 and the slave clock HORL2 to be synchronized, and the frames TR1, TR2 to be timestamped with great accuracy.

In this example, as illustrated in FIG. 3, the analog synchronization signal S comprises a first guard time G1, for example in the order of 3 microseconds, the amplitude setting portion S1, a second guard time G2, for example in the order of 1 microsecond, the optimized synchronization portion S2 and a third guard time G3. In this example, the analog synchronization signal S has a duration in the order of 45 microseconds.

Still with reference to FIG. 3, the amplitude setting portion S1 is in the form of a sine wave, preferably pure. By pure, it is meant that the sine wave consists only of sines. In this example, the amplitude setting portion S1 has a duration in the order of 35 microseconds.

The sine wave has a constant amplitude during a predetermined number of cycles. In this example implementation, the sine wave has an amplitude of between −1V and +1V, but of course it could be different. Similarly, the sine wave has 35 pulses (also called cycles), each pulse being in the form of a sine with a period of 1 microsecond. Each pulse is thus identical. A number of pulses between 16 and 40 is preferred as it ensures a good compromise between speed and accuracy for setting the gain of a slave device D2 as will be set out later.

The frequency of the sine wave depends on the frequency of the master clock HORL1. In this example, the frequency of the sine wave is equal to the frequency of the master clock HORL1.

Still with reference to FIG. 3, the optimized synchronization portion S2 is in the form of a triangular-shaped amplitude modulation of the sine wave, that is, that of the amplitude setting portion S1 so as to determine a reference time instant TOP. In this example, the optimized synchronization portion S2 has a duration in the order of 5 microseconds.

The optimized synchronization portion S2 has pulses having the same frequency as the amplitude setting portion S1 (period of 1 microsecond).

The optimized synchronization portion S2 does not have a constant amplitude but a variable amplitude, A triangular-shaped amplitude modulation is used to define an increasing phase and a decreasing phase and a reference time instant TOP at the transition between the increasing phase and decreasing phase. On reception, the transition between the phases can be detected quickly and accurately, which makes it possible to determine a reference time instant TOP that is very accurate. In this way, clocks HORL1, HORL 2 can be synchronized and time slots of a frame TR1, TR2 can be accurately timestamped.

Preferably, the optimized synchronization portion S2 comprises an odd number of pulses with the central pulse having the highest amplitude to determine the reference time instant TOP. In this example, the optimized synchronization portion S2 comprises five pulses I1-I5 which are symmetrical: pulses I1, I5 have a low amplitude −0.3V/+0.3V, pulses I2, I4 have a medium amplitude −0.7V/+0.7V while the central pulse I3 has a high amplitude −1V/+1V. Each pulse I1-I5 has a same period of 1 microsecond. The reference time instant TOP is defined here when the central pulse I3 has an amplitude of +1V.

The reference time instant TOP is determined for each frame TR1, TR2, that is every 1 ms, and has a very high accuracy of less than 1 microsecond (period of a pulse).

The reference time instant TOP is used to define the beginning of the period at which data X1-X20 are sent respectively by each of the slave devices D2-1 to D2-20 to the master device D1. By means of the invention, this reference time instant TOP is highly accurately known. Moreover, this makes it possible to accurately determine the period of time between two reference time instants TOP, which is in the order of 1 ms, in order to deduce the frequency of the master clock HORL1 therefrom and possibly correct the frequency of the slave clock HORL2.

The transmission and reception of an analog synchronization signal S will now be set forth.

Figure 4:
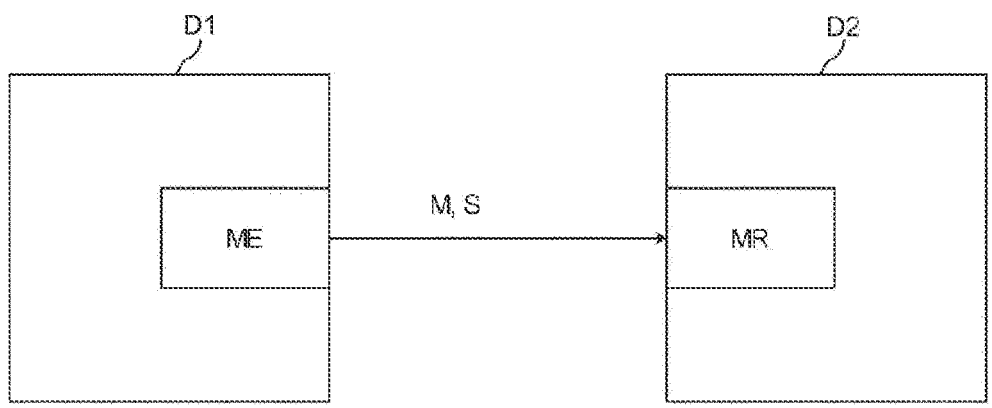
FIG. 4 is a schematic representation of a transmission of signals M and S between a transmission module of a master device and a reception module of a slave device.

With reference to FIG. 4, the transmission of a master signal M and an analog synchronization signal S from a master device D1 to a slave device D2 is schematically represented. To that end, the master device D1 comprises a transmission module ME for transmitting the signals M, S while the slave device D2 comprises a reception module MR for receiving them.

As has been previously set forth, the communication is bidirectional and each slave device D2 comprises a transmission module (not represented) for transmitting the data X1-X20. Similarly, the master device D1 also comprises a reception module for receiving the data X1-X20 (not represented).

Figure 5:
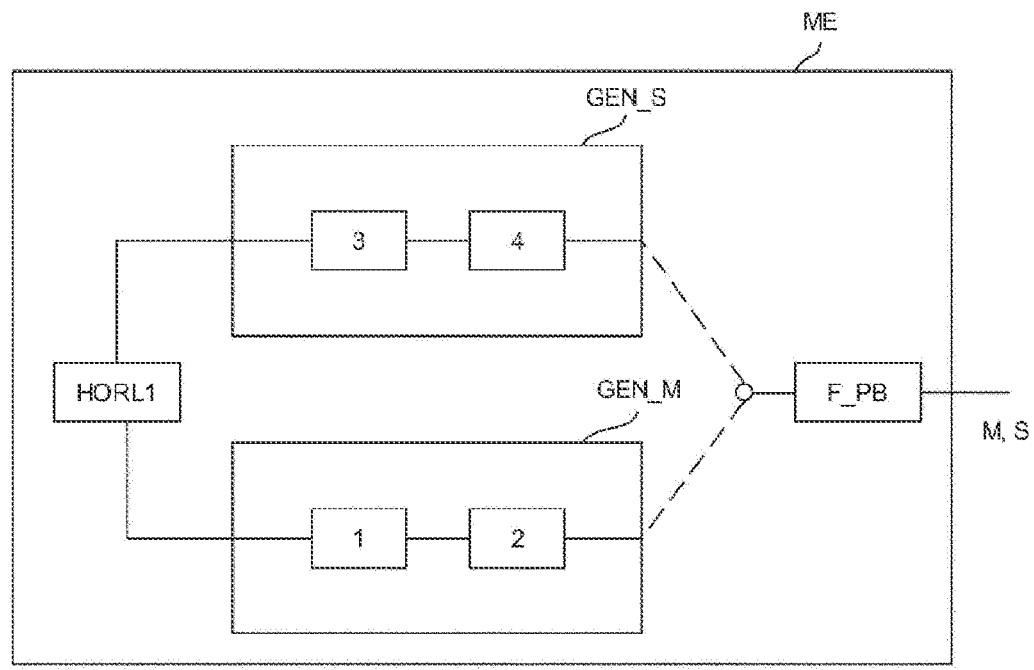
FIG. 5 is a schematic representation of the structure of a transmission module.

Generally speaking, as illustrated in FIG. 5, the transmission module ME comprises a generator GEN_M of the master signal M and a generator GEN_S of the analog synchronization signal S. The transmission module ME has a master clock HORL1, connected to the generators GEN_M, GEN_S, which controls generation rate of the master signal M and the analog synchronization signal S. The transmission module ME further comprises a low-pass filter F_PB which filters the signals M, S before they are transmitted to the slave devices D2.

The generator GEN_M of the master signal M comprises a digital signal processing member 1 and an analog-to-digital converter 2 to form the master signal M. Such a generation is known in prior art and will not be set forth in further detail.

Still with reference to FIG. 5, the generator GEN_S of the analog synchronization signal S comprises a pulse generation member 3 and a processing member 4 for processing said pulses to form the different portions S1, S2 of the analog synchronization signal S.

Figure 6:
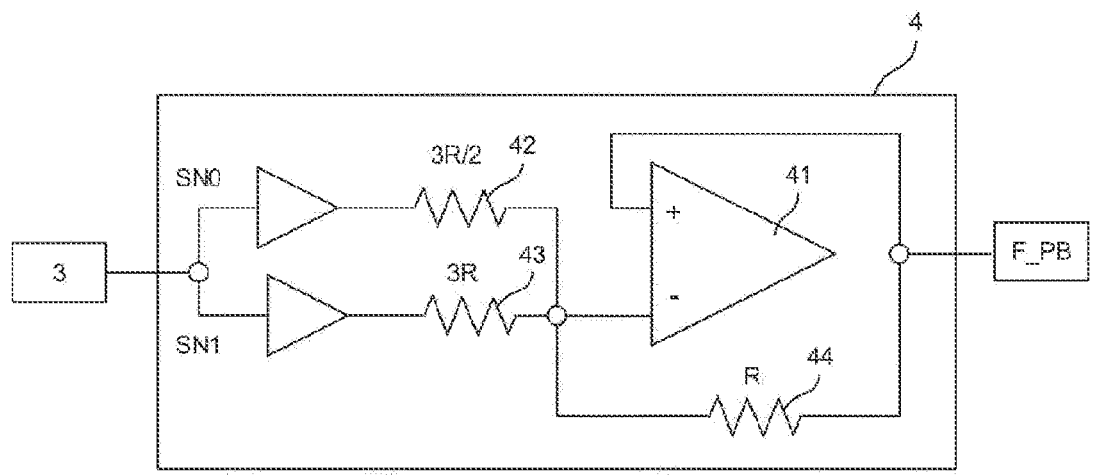
FIG. 6 is a schematic representation of the structure of a processing member of the transmission module of FIG. 5.
Figure 7:
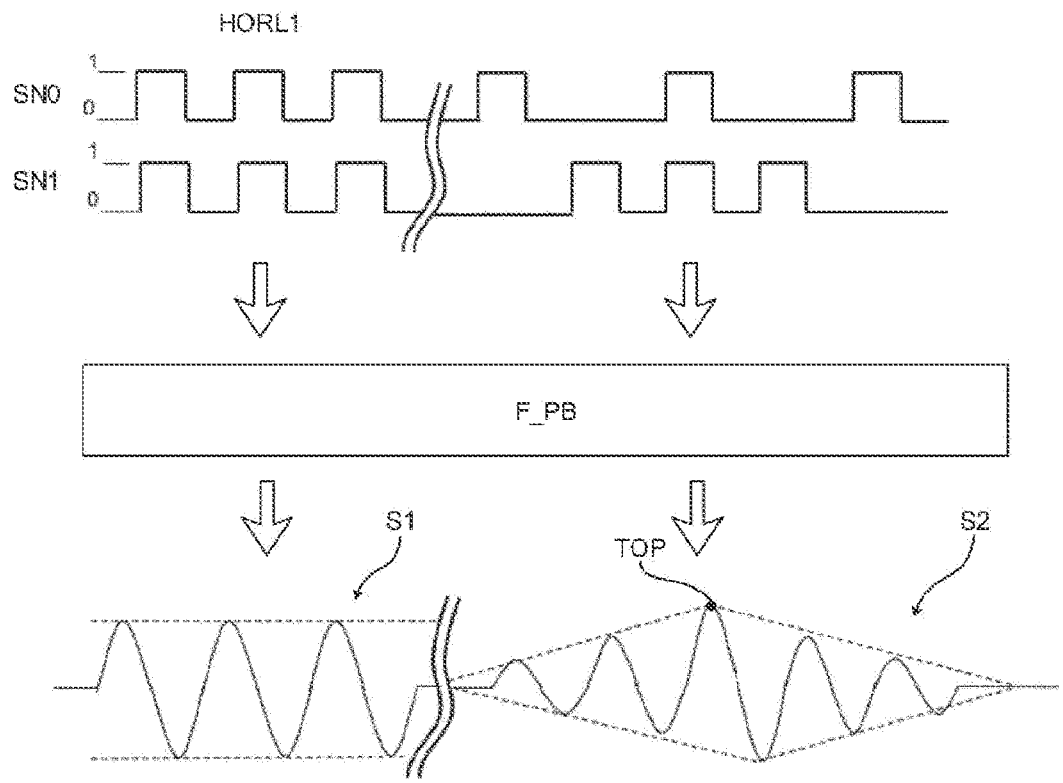
FIG. 7 is a schematic representation of the digital outputs and their processing so as to form an amplitude setting portion and an optimized synchronization portion of an analog synchronization signal.

In detail, as illustrated in FIG. 7, the pulse generation member 3 forms two digital outputs SN0, SN1 which are transmitted to the processing member 4. The frequency of the digital outputs SN0, SN1 depends on the master clock HORL1. The digital outputs SN0, SN1 are binary and coded on four positions and converted into an analog voltage on four levels by the processing member 4 which carries out a weighted adder circuit, in particular, by means of an operational amplifier 41 and a set of resistors 42, 43, 44 as illustrated in FIG. 6. The processing member 4 enables a triangular-shaped amplitude modulation of the optimized synchronization portion S2 to be carried out by means of a low-complexity digital chain.

The FIG. 6 represents only the generation of the positive part of the pulses. To generate the negative part of the pulses in a bipolar mode, two further digital outputs are preferably provided.

Advantageously, as illustrated in FIG. 7, the sequencing of the digital outputs SN0, SNI allows the generation of the totality of the pulses, that is, both those of the amplitude setting portion S1 and those of the optimized synchronization portion S2.

As illustrated in FIG. 7, after application of a low-pass filter F_PB, the amplitude setting portion S1 comprising pulses of the same amplitude and the optimized synchronization portion S2 comprising increasing pulses up to the reference time instant TOP and then decreasing pulses, are obtained.

Advantageously, the reference time instant TOP is directly generated from the master clock HORL1 digitally and then filtered to keep only the fundamental frequency of the signal. The analog synchronization signal S is thus strongly correlated to the master clock HORL1. The master clock HORL1 can thus be easily determined by a slave device D2.

The transmission module ME has a low complexity structure, which reduces its cost and makes its adoption easier.

Figure 8:
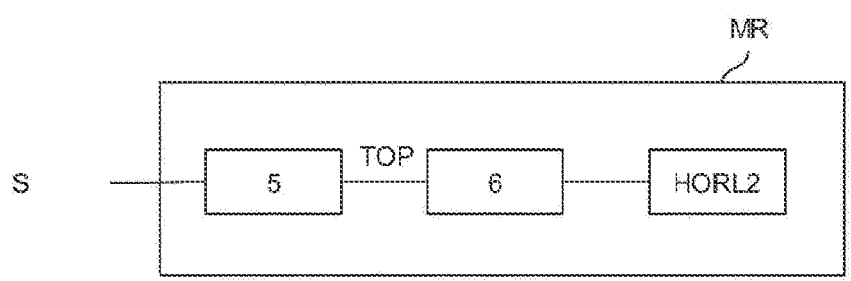
FIG. 8 is a schematic representation of the structure of a reception module.

As illustrated in FIG. 8, the reception module MR comprises an extraction system 5 for extracting reference time instants TOP and a setting system 6 for setting a slave clock HORL2 from said reference time instants TOP.

Figure 9:
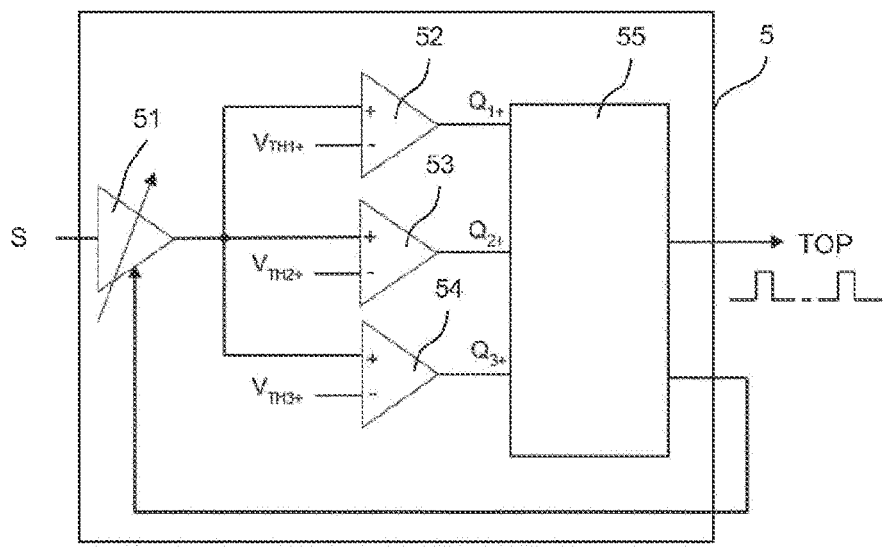
FIG. 9 is a schematic representation of an extraction system for extracting the reference time instants of the reception module of FIG. 8.

As illustrated in FIG. 9, the extraction system 5 comprises a programmable gain amplifier 51 which is configured to set its gain parameter as a function of the amplitude of the amplitude setting portion S1 of the analog synchronization signal S. In other words, its function is to normalize amplitude of the amplitude setting portion S1 to a predetermined reference value.

Figure 10:
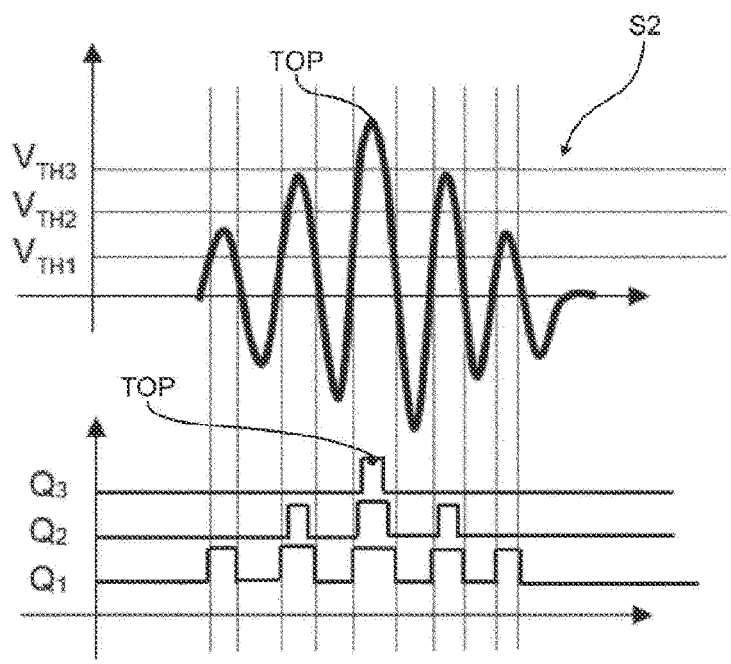
FIG. 10 is a schematic representation of the determination of a reference time instant by means of the voltage comparators of the extraction system of FIG. 9.

Still with reference to FIG. 9, the extraction system 5 further comprises voltage comparators 52, 53, 54 which are configured to convert amplitude of the analog synchronization signal S into digital signals Q1, Q2, Q3. Of course, the number of comparators could be different. The voltage comparators 52, 53, 54 are configured to compare the amplitude of the analog synchronization signal S, in particular the amplitude setting portion S1, with pre-determined voltages VTH1+, VTH2+, VTH3+. As illustrated in FIG. 10, the pre-determined voltages VTH1+, VTH2+, VTH3+ are increasing (trigger thresholds gradually set from 0 to 100% of the maximum value). Advantageously, digital signals that are digitally coded on 2 bits are obtained. The reception module MR thus enables the amplitude of the analog synchronization signal S to be accurately determined in order to set the programmable gain amplifier 51. Advantageously, the numerous constant amplitude pulses in the amplitude setting portion S1 allow the gain to be quickly and accurately set.

The voltage comparators 52, 53, 54 are also configured to compare amplitude of the optimized synchronization portion S2 with the predetermined voltages $VTH1_+$, $VTH2_+$, $VTH3_+$ so as to detect an increasing amplitude phase and a decreasing amplitude phase to deduce the reference time instant TOP which is located at the transition between the two phases therefrom.

Advantageously, as illustrated in FIG. 10, following the comparison steps, the optimized synchronization portion S2 is converted into a plurality of digital signals Q1. Q2, Q3 which highlight the reference time instant TOP. Advantageously, even if one of the digital signals Q1, Q2, Q3 is missing, the reference time instant TOP can still be determined.

Preferably, the digital signals Q1, Q2, Q3 are digitally sampled at a high frequency, for example 4 to 16 times the base frequency, to detect small width variations due to the sine shape. This allows the increasing amplitude phase and the decreasing amplitude phase, and hence the reference time instant TOP located at the transition, to be very accurately detected.

Figure 11:
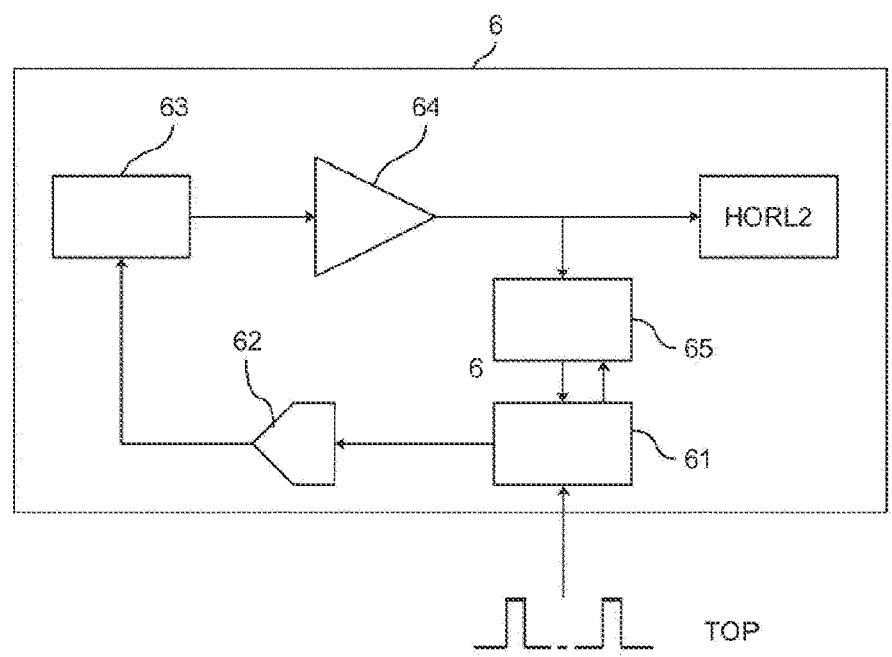
FIG. 11 is a schematic representation of a slave clock generation system of the reception module of FIG. 8.

With reference to FIG. 9, the extraction system 5 further comprises a digital processing member 55 configured to extract the reference time instant TOP from the digital signals Q1, Q2, Q3. The successive reference time instants TOP, transmitted every 1 ms, are transmitted to the setting system 6 of a slave clock HORL2 illustrated in FIG. 11.

Such a setting system 6 is known per se to the skilled person. In this example, the setting system 6 comprises a servo control and frequency measurement controller 61 using the sequence of reference time instants TOP as a time reference and a voltage controlled oscillator "VCO" 63 connected to the servo control and frequency measurement controller 61 via an analog-to-digital converter 62. The voltage controlled oscillator 63 is connected to a buffer 64 to form the slave clock HORL2.

In this example, the setting system 6 further comprises a digital counter 65 which counts the number of pulses of the slave clock HORL2 in a 1 ms slot in order to determine its frequency, the servo control and frequency measurement controller 61 enables the servo control of the slave clock HORL2 with respect to the master clock HORL1. Thus, the master clock HORL1 is determined from the sequence of reference time instants TOP, time-tagged every 1 ms, to correct a possible drift of the frequency of the slave clock HORL2.

The setting system 6 is independent of the extraction system 5, which advantageously allows the overall power consumption to be reduced by putting in standby the digital parts not used outside the time slice assigned to the slave device D2. Furthermore, this reduces the variable and random latencies associated with the digitization of analog signals.

Thus, the reception module MR advantageously enables the amplitude (gain) to be set and the slave clock HORL2 to be synchronized with the master clock HORL1 following the reception of an analog synchronization signal S.

With reference now to FIG. 4, a master device D1 transmits signals M, S, through its transmission module ME, to a slave device D2 which by means of its reception module MR, allows the amplitude (gain) to be set and the slave clock HORL2 to be synchronized with the master clock HORL1. Since the slave clock HORL2 is servo-controlled to the master clock HORL1, this improves performance of the data demodulation of the frame TR1, TR2. In addition, the reference time instant TOP gives a microsecond time reference allowing the slave devices D2 to perform accurate time-tagging of the data packets X1-X20 relative to this reference time instant TOP. The master device D1 can thus reconstruct the accurate timestamping of the data packets based on the state of its master clock HORL1 at the previous reference time instant TOP and the relative time-tagging provided by the slave device D2.

Advantageously, a high frequency accuracy (in the order of +/−100 ppm) is achieved by regular drift compensation even at high temperatures. This is particularly advantageous in comparison with conventional quartz or surface wave components.

Finally, since the synchronization according to the invention is efficient, the usual synchronization preamble of the signals M and X1-X20 can be removed from each digital frame TR1, TR2 and thus the useful bandwidth can be increased.

The invention claimed is:

1. A method of communication according to a TDMA protocol between a master device and at least one slave device during which a plurality of frames are transmitted between the master device and the slave device, each frame being partitioned into a plurality of time slots, at least one time slot comprising an analog synchronization signal, transmitted by the master device to the slave device, comprising:
    transmitting a predetermined number of pulses between the master device and the at least one slave device, wherein the predetermined number of pulses comprising: (1) an amplitude setting portion which is in the form of a sine wave having a constant amplitude, and (2) an optimized synchronization portion which is in the form of a triangular-shaped amplitude modulation of the sine wave so as to determine a reference time instant.

2. The method of communication according to claim 1, wherein the triangular-shaped amplitude modulation of the sine wave comprises an increasing amplitude phase and a decreasing amplitude phase, the reference time instant being determined at the transition between the increasing amplitude phase and the decreasing amplitude phase.

3. The method of communication according to claim 1, wherein the triangular-shaped amplitude modulation of the sine wave comprises an odd number of pulses, the reference time instant being determined during a central pulse.

4. The method of communication according to claim 1, wherein the sine wave is pure.

5. The method of communication according to claim 1, wherein the sine wave has a period between 0.1 and 10 microseconds.

6. The method of communication according to claim 1, wherein the amplitude setting portion has a number of pulses greater than 16.

7. A transmission module for transmitting data from a master device to at least one slave device in a frame according to a TDMA protocol, each frame being partitioned into a plurality of time slots, at least one time slot comprising an analog synchronization signal, the analog synchronization signal comprising an amplitude setting portion which is in the form of a sine wave having a constant amplitude during a predetermined number of pulses, and an optimized synchronization portion which is in the form of a triangular-shaped amplitude modulation of the sine wave so as to determine a reference time instant, the transmission module comprising a generator of a master signal, a generator of the analog synchronization signal and a master clock, connected to the two generators, which controls the generation rate of the master signal and the analog synchronization signal.

8. The transmission module according to claim 7, in which the generator of the analog synchronization signal comprises a pulse generation member and a processing member for processing said pulses in order to form the different portions of the analog synchronization signal, the processing member comprising a weighted adder circuit so as to carry out a triangular-shaped amplitude modulation of the optimized synchronization portion.

9. A reception module for receiving data, transmitted by a master device to at least one slave device, in a frame according to a TDMA protocol, each frame being partitioned into a plurality of time slots, at least one time slot comprising an analog synchronization signal, the analog synchronization signal comprising an amplitude setting portion which is in the form of a sine wave having a constant amplitude during a predetermined number of pulses and an optimized synchronization portion in the form of a triangular-shaped amplitude modulation of the sine wave so as to determine a reference time instant, the reception module comprising an extraction system for extracting the reference time instants and a setting system for setting a slave clock from said reference time instants.

10. The reception module according to claim 9, wherein the extraction system comprises a programmable gain amplifier and voltage comparators configured to accurately determine the amplitude of the analog synchronization signal and to deduce a setting of the programmable gain amplifier therefrom.

11. An assembly of a transmission module according to claim 7 and a reception module configured for receiving data, transmitted by the master device to the least one slave device, the reception module comprising an extraction system for extracting the reference time instants and a setting system for setting a slave clock from said reference time instants.

* * * * *